United States Patent [19]
Watt et al.

[11] Patent Number: 4,541,688
[45] Date of Patent: Sep. 17, 1985

[54] OPTICAL BEAM SPLITTERS

[75] Inventors: Peter B. Watt, Welwyn; Richard A. Sharman, Houghton Regis, both of England

[73] Assignee: Eastman Kodak Company, Rochester, N.Y.

[21] Appl. No.: 619,454

[22] Filed: Jun. 11, 1984

[51] Int. Cl.⁴ .................. G02B 27/10; G02B 17/00
[52] U.S. Cl. ........................... 350/171; 350/433; 350/447; 350/1.1; 350/276 R
[58] Field of Search ............... 350/171, 170, 169, 173, 350/433, 447, 1.1, 276 R

[56] References Cited
U.S. PATENT DOCUMENTS

| | | | |
|---|---|---|---|
| 2,669,900 | 2/1954 | Cherry | 350/169 |
| 2,672,502 | 3/1954 | Albright | 350/169 |
| 2,740,832 | 4/1956 | Andrews | 350/169 |
| 2,792,740 | 5/1957 | Haynes | 350/171 |
| 3,794,407 | 2/1974 | Nishimura | 350/171 |
| 4,003,634 | 1/1977 | Graser et al. | 350/171 |

*Primary Examiner*—Jon W. Henry
*Attorney, Agent, or Firm*—Raymond L. Owens

[57] ABSTRACT

An optical beam splitter is provided which removes aberrations such as coma and transverse chromatic aberration by subjecting all transmitted rays to equal and opposite amounts of induction of coma and transverse chromatic aberration, by curing residual astigmatism by providing a terminal astigmatism correcting lens in each transmitted ray path, and by avoiding ghost images by ensuring adequate separation between the main image and any ghost images. The splitter thus permits the use of high resolution, low sensitivity, linear charge coupled devices in image analysis.

3 Claims, 3 Drawing Figures

MAIN IMAGE
GHOST IMAGE

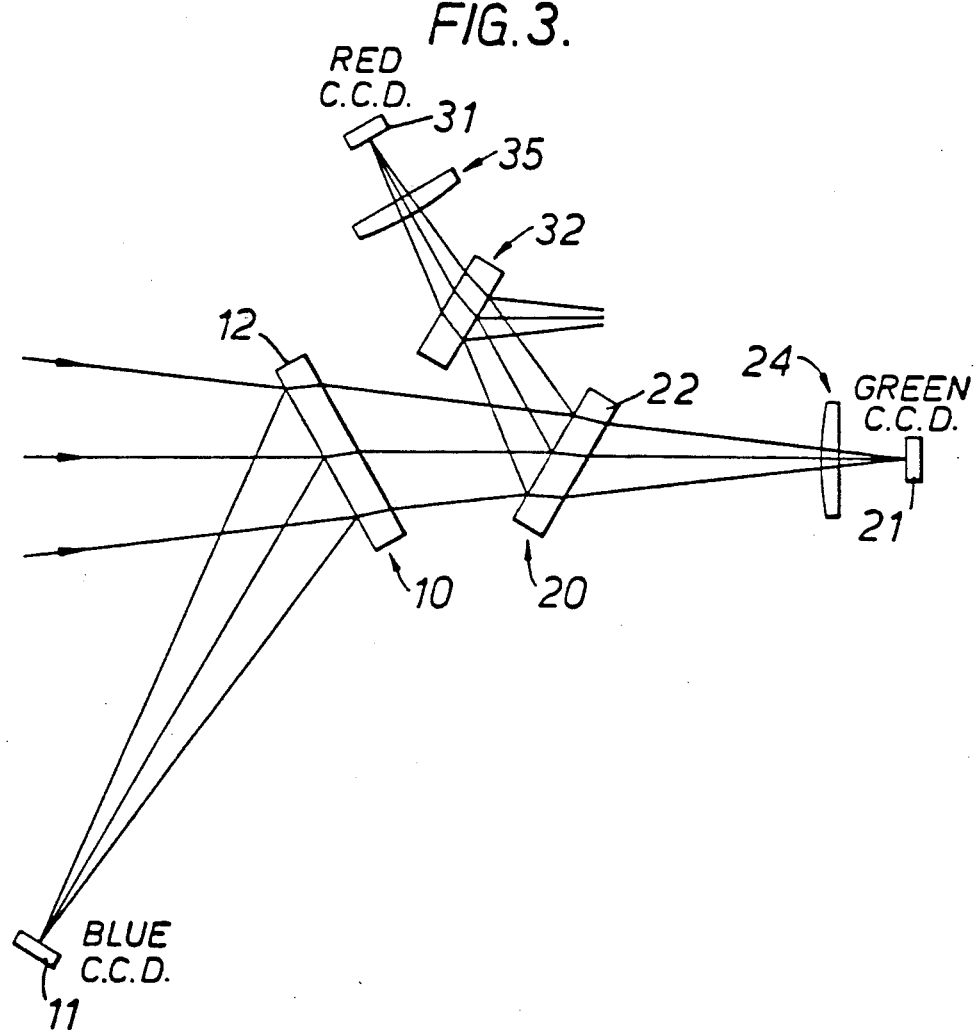

OPTICAL BEAM SPLITTERS

BACKGROUND OF THE INVENTION

1. Field of the Invention

This invention relates to optical beam splitters for separating three colored light beams from a light beam having the image content of an original.

2. Description of the Prior Art

In image analyzing devices, it is conventional to scan, point-to-point, an original with a spot of light and to analyze the modulated light transmitted by or reflected from the original to determine its spectral content and brightness. The analysis is generally effected by splitting the modulated light into three colors, for example red, green and blue and to measure the amount of light of each of the colors by means of respective photoresponsive devices. The scanning can be effected by means of a raster on the face plate of a cathode ray tube which is imaged onto the original. Alternatively, the point of light may be caused to move across the original respectively in one direction while the original is moved (at a slower rate) orthogonally in its own plane.

The modulated and split light is collected and directed onto the respective photoresponsive devices and signals therefrom are representative of the color content of the original on a point-to-point basis. Such signals can be stored and/or used indirectly or directly in a reproductive process.

The beam splitting may be effected by semireflective mirrors which may be dichroic and/or which may be followed by color filters so that each photoresponsive device receives only light of one of the three colors. A conventional beam splitter is in the form shown in FIG. 1 of the accompanying drawings and comprises three prisms, two of which have dichroic filters coated on one of their faces. Such a beam splitter is costly and has inherent disadvantages but is of the kind normally used when two dimensional scanning of an original is effected such as in a television camera.

U.S. Pat. No. 2,792,740 describes a more basic form of beam splitter but explains that problems arise using inclined dichroic or semitransparent mirrors as the beam splitting elements. These problems are: "ghost images" due to interreflections between the surface of each of the mirror supports, transverse chromatic aberration, coma and astigmatism.

Linear charge coupled devices (CCDs) have now been developed. The individual cells of the array are small enough to give a pixel size providing acceptable resolution. An illuminated line of an original to be scanned is imaged on the array. Three such arrays, with an appropriate beam splitter are used. The original is preferably moved so that successive lines thereof are imaged on the arrays. A linear CCD array may typically be 10 to 15 mm long and contain 1000 cells in the linear array. Each pixel is then 1 thousandth of the width of the original in the direction of the line of illumination. For example, the light received by each cell of the CCD, for acceptable definition, derives from an area of the original no greater than 0.25 mm (and preferably of the order of 0.025 mm) length in the direction of the line of illumination.

Unfortunately, the amount of light received by each cell (the integral of light against time) is very small and the lens, imaging the line of light on the array, to provide a sufficient quantity of illumination, must therefore work at an aperture of, for example, f4 or greater. The greater the aperture of the lens, the greater is the tendency for optical aberrations and other optical faults to arise. When using linear CCD arrays, as described above, faults such as astigmatism and ghost images which would be present using the arrangement described in U.S. Pat. No. 2,792,740 would be totally unacceptable. The arrangement described in that specification will overcome the problem of coma and transverse chromatic aberration and normalizes astigmatism for all three channels. Astigmatism may also be overcome totally but in a way that creates ghost images transverse to the line of illumination. The problems of ghost images and/or astigmatism therefore remain.

SUMMARY OF THE INVENTION

The present invention seeks to overcome the aforesaid disadvantages in a simple yet inexpensive manner while fully utilizing the advantages afforded by the newly developed linear charged coupled device arrays.

The invention provides an optical beam splitter, for use in analyzing the image content of an original by splitting light transmitted through or reflected from the original into three colors by means of dichroic mirrors mounted on transparent support media, each transparent support medium inducing transverse chromatic aberration, coma and astigmatism in the rays of light transmitted thereby, the beam splitter including at least one further transparent plate, such that light transmitted by the beam splitter to respective linear charge coupled device arrays has induced therein an even number of equal and opposite coma and transverse chromatic aberration constritions, and a respective terminal astigmatism correcting lens in each transmitted light path, before the respective CCD array, for focusing the fully corrected line of light thereon.

Preferably, there are two dichroic mirrors each mounted on a transparent supporting medium, the mirrors being inclined at equal and opposite angles to the axis of the system, and one further transparent plate, light of a first color being reflected from the first dichroic mirror and light of second and third colors are transmitted thereby, light of the second color being reflected by the second dichroic mirror and transmitted by the further transparent plate, and light of the third color being transmitted by the second dichroic mirror such that light of the first color is not transmitted and has zero coma, transverse chromatic aberration or astigmatism induced therein, light of the second color has two equal and opposite amounts of coma and transverse chromatic aberration induced therein in its passage through the transparent support medium of the first dichroic mirror and through the transparent plate, and light of the third color has two equal and opposite amounts of coma and transverse chromatic aberration induced therein on passage through the transparent support media of the first and second dichroic mirrors.

Each terminal astigmatism correcting lens may be in the form of a plano-convex cylindrical lens having its axis parallel to the length of the respective linear array of CCDs.

The transparent support media and the transparent plate are arranged to be sufficiently thick that ghost images caused by internal reflection are imaged at a location remote from the sensitive surface of the charge coupled devices.

Infrared light, inherently produced by most light sources, is not absorbed to any great extent by photographic dyes. It is necessary to ensure that that CCD array which would normally receive infrared light (the "red" array) does not do so. This is ensured by providing an infrared reflecting surface, for example, on the transparent plate.

With such a beam splitter, transverse chromatic aberration, coma, astigmatism and ghost images are avoided even though the optical paths may include lenses working at apertures of f4 or larger and the resolution of the image is within the commercially acceptable range utilizing presently available arrays of charge coupled devices.

BRIEF DESCRIPTION OF THE DRAWINGS

The invention will be described further, by way of example, with reference to the accompanying drawings, in which:

FIG. 3 is a diagrammatic representation of an optical beam splitter in accordance with the present invention.

DESCRIPTION OF THE PREFERRED EMBODIMENT

Figure 1:
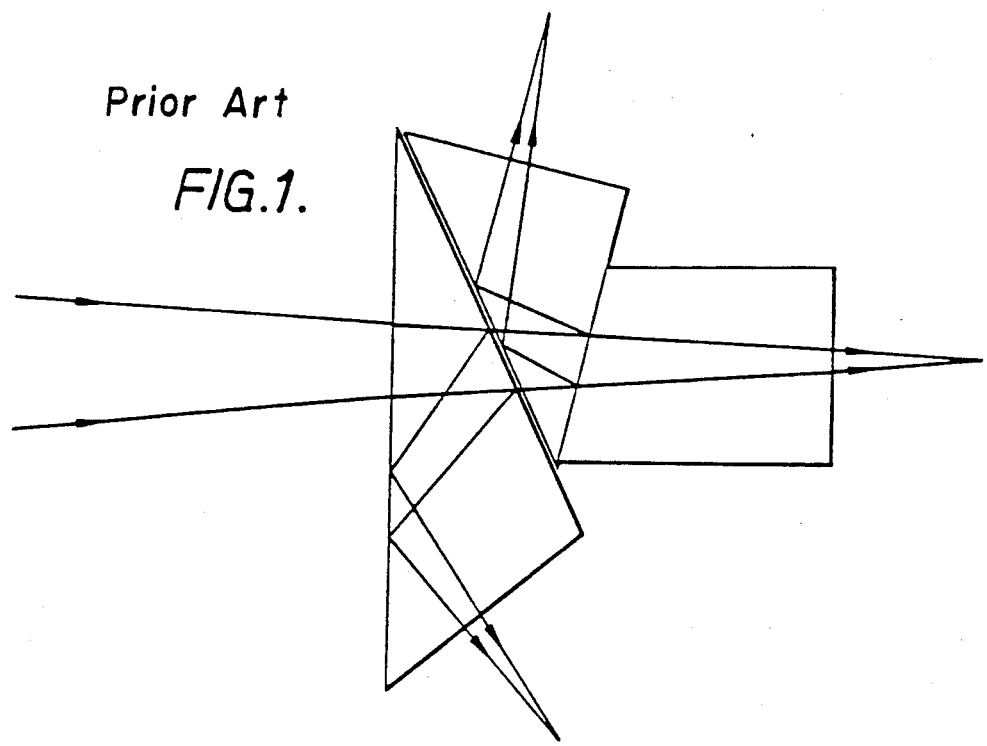
FIG. 1 shows a conventional prior art beam splitter having three prisms.

The optical beam splitter, in accordance with the present invention is useful in an image analyzing apparatus instead of the relatively expensive beam splitter shown in FIG. 1.

An image analyzing device incorporating the present invention, comprises means (not shown) for holding an original such as a photographic negative to be analyzed, means (not shown) for illuminating the original, slit means for passing light transmitted by a narrow width line of the original, and mechanical means (such as original moving means) for causing the slit to pass light transmitted by successive line portions of the original.

Light modulated by transmission through the original is ultimately focused onto linear arrays of charge coupled devices (CCDs) responsive respectively to light of a particular color. The beam splitter of the present invention is interposed in between the original and the linear CCD arrays.

As shown in FIG. 3 of the drawings, the beam splitter according to the invention comprises a first dichroic mirror 10 having a dichroic coating on the front surface of a transparent supporting medium 12 which coating reflects blue light to a first linear CCD array 11 extending at right angles to the plane of the drawing. The image modulated light is focused onto the array. The CCD array 11 is sensitive to blue light and may have an appropriate correcting filter (not shown) in the path thereto after the dichroic mirror 10 to overcome spectral deficiencies of the dichroic coating. Red and green image modulated light impinging on the dichroic surface of the mirror 10 is transmitted thereby and passes through the transparent supporting medium 12. In so doing, transverse chromatic aberration, coma and astigmatism are induced in the image rays.

Figure 2:
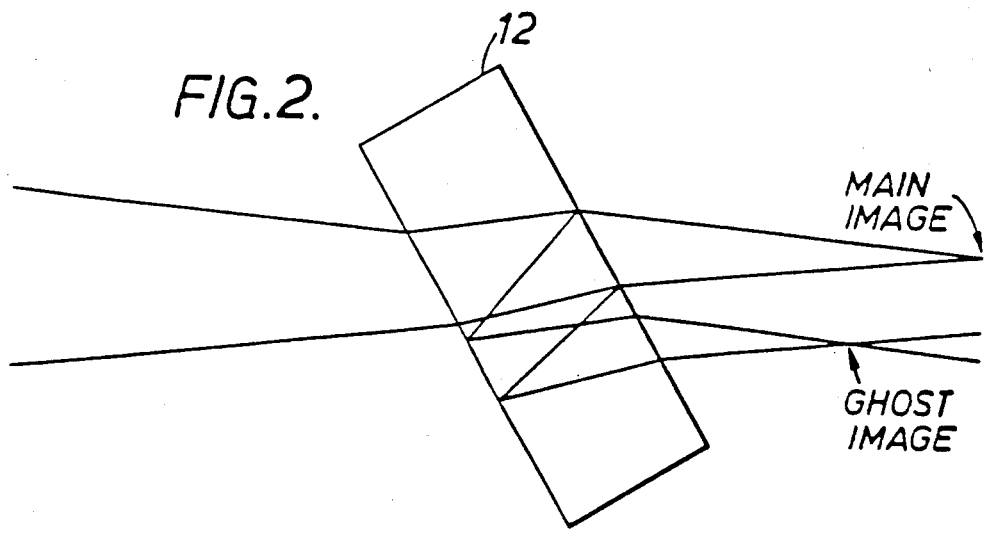
FIG. 2 illustrates a transparent support medium of thickness sufficient adequately to separate desired light from an unwanted first order ghost image of such light.

Transmission through the medium 12 gives rise to at least a discernable first order ghost image due to internal reflections (see FIG. 2). The medium 12 is made sufficiently thick that the first and subsequent order ghost images are displaced sufficiently from the optical path so as to be imaged parallel to but displaced from the respective linear CCD array.

The transmitted red and green light then impinge on the surface of a second dichroic mirror 20 having a dichroic coating on its front surface which reflects red light and transmits green light which passes through the transparent support medium 22. Coma, astigmatism and transverse chromatic aberration are induced in the transmitted green light but because the transparent supporting medium 22 is of the same material and thickness but oppositely inclined to the medium 12, the transverse chromatic aberration and coma induced are equal and opposite to those induced on transmission through the medium 12 and are therefore corrected. Astigmatism due to light transmission through both the media 12 and 22 is additive and the image, in one plane, would not be in focus at the same distance from the medium 22 as the image in a plane at right angles thereto. A terminal astigmatism correcting lens 24 in the form of a plano-convex cylindrical lens of axis parallel to the length of the array is therefore interposed between the medium 22 and the CCD array 21 so that a fully corrected accurately focused image of the line of green light from the original impinges on the CCD array 21. Any ghost images produced by internal reflection in the medium 22 are focused as a line parallel to, but displaced from the linear CCD array 21. As in the case of the "Blue" CCD array, appropriate correcting filters may be interposed between the medium 22 and the CCD array 21.

The image modulated red light is reflected from the surface of the dichroic mirror 20 and, as this red light has only passed through the plate 12, an oppositely inclined transparent plate 32 is located such that the reflected red light passes therethrough. In this way, equal and opposite transverse chromatic aberration and coma are induced to that induced by the medium 12. Thus coma and transverse chromatic aberration are corrected. However, further astigmatism is induced on transmission through the plate 32 and an astigmatism correcting lens 35 (similar to the lens 24) is located so that the red light passing through the plate 32 is fully corrected and can be accurately focused onto the sensitive surface of a "red" CCD array 31. Similarly any ghost images caused by the plate 32 are focused as line images parallel to but displaced from the array 31.

Infrared light (which is not absorbed by photographic dyes and hence is unmodulated by the image on the original) is normally reflected by the surface of the dichroic mirror 20 and would normally fall upon the "red" CCD array 31. CCDs are sensitive to infrared radiation. The transparent plate 32 has a dichroic coating on the surface 33 thereof which reflects infrared radiation but transmits image modulated red light.

It will be appreciated that medium 12 and the medium 22 and the medium 12 and the plate 32 are of thickness and refractive index such that each induces an equal and opposite amount of coma and transverse chromatic aberration for all rays passing through each pair. The support media and the plate are preferably of glass and are each of such thickness (see FIG. 2) that adequate separation takes place between desired and first and subsequent order ghost images generated by internal reflection. Lenses used in the system can work at apertures of f4 and greater. In this way, linear CCD arrays can be used for image analysis without any optical degradation which would cause incorrect signals and consequent loss of image quality in any reproduction.

We claim:

1. A beam splitter for separating three colored light beams from a light beam having the image content of an original, each of such colored light beams being adapted to illuminate a respective CCD array, comprising:
   (a) a first transparent support having a first dichroic mirror mounted thereon and arranged so that the first mirror reflects the first colored light beam and the first support transmits the remaining colored beams and induces coma and chromatic aberration in such transmitted beams;
   (b) a second transparent support having a second dichroic mirror mounted thereon and arranged so that the second mirror reflects the second colored light beam and the second support transmits the third colored light beam and induces an equal and opposite amount of coma and chromatic aberration in the third light beam to that induced in such third light beam by the first support;
   (c) a transparent plate arranged to transmit the second beam and induce an equal and opposite amount of coma and chromatic aberration in the second light beam to that induced in such second light beam by the first support; and
   (d) the first and second transparent supports and the transparent plate being selected to be sufficiently thick, so that ghost images caused by internal support and plate reflections are imaged at locations remote from the CCD arrays.

2. The invention as set forth in claim 1, further including first and second cylindrical optical elements for respectively correcting astigmatism in the second and third light beams.

3. The invention as set forth in claim 2, wherein the second light beam is red and an infrared reflecting surface is disposed on the surface of the transparent plate so as to reflect infrared light so that such infrared light will not be transmitted through such plate.

* * * * *